(12) United States Patent
Simons et al.

(10) Patent No.: US 7,092,611 B2
(45) Date of Patent: Aug. 15, 2006

(54) METHOD FOR MANUFACTURING A BAR-SHAPED PREFORM AS WELL AS A METHOD FOR MANUFACTURING OPTICAL FIBRES FROM SUCH A BAR-SHAPED PREFORM

(75) Inventors: Dennis Robert Simons, Eindhoven (NL); Arnold Bloemendal, Eindhoven (NL)

(73) Assignee: Draka Fibre Technology B.V., Eindhoven (NL)

( * ) Notice: Subject to any disclaimer, the term of this patent is extended or adjusted under 35 U.S.C. 154(b) by 0 days.

(21) Appl. No.: 10/488,098

(22) PCT Filed: Aug. 28, 2002

(86) PCT No.: PCT/NL02/00564

§ 371 (c)(1),
(2), (4) Date: Dec. 20, 2004

(87) PCT Pub. No.: WO03/022760

PCT Pub. Date: Mar. 20, 2003

(65) Prior Publication Data

US 2005/0081566 A1 Apr. 21, 2005

(30) Foreign Application Priority Data

Sep. 13, 2001 (NL) .................................. 1018951

(51) Int. Cl.
*G02B 6/00* (2006.01)
*C03B 37/018* (2006.01)

(52) U.S. Cl. .......................... 385/147; 65/397; 65/419

(58) Field of Classification Search ................... 65/397
See application file for complete search history.

(56) References Cited

U.S. PATENT DOCUMENTS

| | | | | |
|---|---|---|---|---|
| 4,045,198 A | * | 8/1977 | Rau et al. | 65/398 |
| 4,262,035 A | * | 4/1981 | Jaeger et al. | 427/571 |
| RE30,635 E | | 6/1981 | Kuppers et al. | |
| 4,468,413 A | * | 8/1984 | Bachmann | 65/391 |
| 4,822,136 A | * | 4/1989 | Hicks, Jr. | 385/142 |
| 4,859,222 A | * | 8/1989 | Bauch et al. | 65/399 |
| 5,958,644 A | * | 9/1999 | Ueda et al. | 430/128 |

FOREIGN PATENT DOCUMENTS

| | | |
|---|---|---|
| FR | 2 426 618 | 1/1980 |
| FR | 2 576 693 | 8/1986 |
| FR | 2 620 696 | 3/1989 |
| JP | 59 195549 | 11/1964 |
| JP | 59008634 | 1/1984 |
| JP | 63307136 | 12/1988 |

* cited by examiner

*Primary Examiner*—Michelle Connelly-Cushwa
*Assistant Examiner*—Chris Chu
(74) *Attorney, Agent, or Firm*—Oblon, Spivak, McClelland, Maier & Neustadt, P.C.

(57) ABSTRACT

The present invention relates to a method for manufacturing a bar-shaped preform. The present invention further relates to a method for manufacturing optical fibers using the manufactured bar-shaped preform.

11 Claims, 1 Drawing Sheet

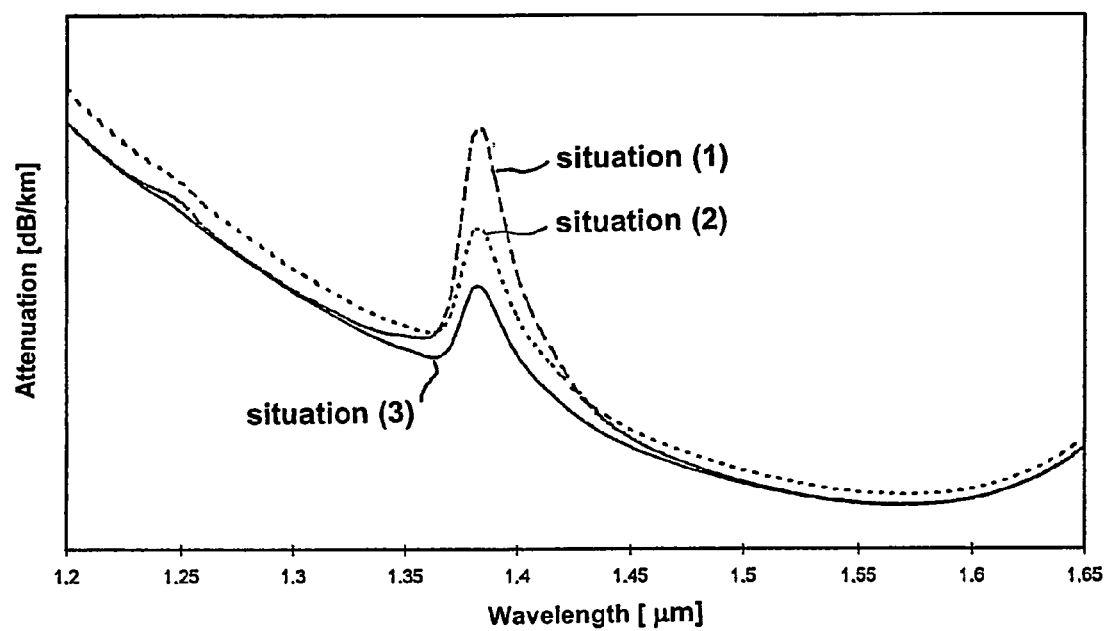

METHOD FOR MANUFACTURING A BAR-SHAPED PREFORM AS WELL AS A METHOD FOR MANUFACTURING OPTICAL FIBRES FROM SUCH A BAR-SHAPED PREFORM

This application is the National Stage Application of the International Application PCT/NL02/00564 filed Aug. 28, 2002, the contents of which are hereby incorporated by reference and this application claims priority to the Netherlands application 1018951 filed Sep. 13, 2001.

BACKGROUND OF THE INVENTION

1. Field of the Invention

The present invention relates to a method for manufacturing a bar-shaped preform, which method comprises the following steps:

i) supplying one or more reactive gases, which may or may not be doped, to the interior of a substrate tube, ii) carrying out a deposition reaction of gases from step i) in said substrate tube so as to obtain one or more glass layers on the interior of the substrate tube, and iii) contracting the substrate tube from step ii) while heating said tube so as to obtain the massive, bar-shaped preform.

The present invention further relates to a method for manufacturing optical fibres, using such a bar-shaped preform.

2. Discussion of the Background

Such a method is known per se from U.S. Pat. No. RE 30.635. According to said US patent, a PCVD (Plasma Coating Vapor Deposition) process is used for manufacturing internally clad glass tubes from which optical fibres are drawn, which tubes consists of a core and a jacket of glass, which core and which jacket have different refractive index values. In order to obtain an optical fibre having a low attenuation, due to the presence of OH groups, at a wavelength of 1385 nm, a hydrogen-free fluor compound is generally supplied to the hollow substrate tube. The addition of such a fluor compound prevents the incorporation of OH-groups during the PCVD process. The incorporation of fluor in the glass structure causes the refractive index value of the glass to decrease, however. Said decrease is subsequently compensated by adding to the reactive gas mixture a component which has properties that cause the refractive index to increase, for example $GeO_2$. One drawback of such a method is the fact that it leads to an increase of the total amount of dopes in the glass structure, resulting in an undesirable attenuation increase caused by the so-called Rayleigh scattering.

SUMMARY OF THE INVENTION

The object of the present invention is to provide a method for manufacturing a bar-shaped preform, from which preform optical fibres can be drawn, in which the incorporation of OH-groups in the glass layers is prevented in such a manner that said prevention will not take place at the expense of an increase of the Rayleigh scattering, which scattering is caused by an increase in the amount of dopes.

Another object of the present invention is to provide a method for manufacturing a bar-shaped preform, from which preform optical fibres can be drawn, the goal being a decrease of the attenuation peak at 1385 nm without this decrease leading to an increase of the attenuation in the rest of the spectrum.

The method as referred to in the introduction is characterized in that the amount of fluor compound that is supplied to the interior of the substrate tube in accordance with step i) is increased by a value of at least 10% at the end of the deposition of glass layers on the inner side of the substrate tube in accordance with step ii), after which the substrate tube is subjected to a heat treatment under conditions such that diffusion of the additionally incorporated fluor from the deposited glass layers will occur.

The inventors have thus found that it is possible to add an additional amount of fluor compound during the PCVD process, in particular at least an additional 10%, preferably at least 20%, without such an additional amount leading to an increase of the total amount of dopes in the final optical fibre. The fact is that it has become apparent that step iii) can be carried out in such a manner that the additionally incorporated fluor compound will diffuse from the deposited layers. It should be understood that fluor will be incorporated in the glass layers, so that fluor will exit when the intended diffusion takes place. This makes it possible to reduce the attenuation caused by the presence of OH-groups without the attenuation undesirably increasing due to Rayleigh scattering. The heat treatment in accordance with step iii) is carried out in such a manner that the additional amount of fluor compound will diffuse from the deposited layers, which preferably takes place by slightly reducing the temperature that is used during the contraction step in comparison with the temperature that is conventionally used, with the heat treatment in addition being carried out for a slightly longer period of time than usual. Because the additional amount of fluor compound diffuses from the deposited layers during the contraction treatment, there is no need to carry out an additional compensation step comprising the usual additional supplying of one of more dopes which increase the refractive index.

BRIEF DESCRIPTION OF THE DRAWINGS

FIGURE of spectral attenuation gradient of optical fibers showing attenuation as a function of wavelength.

DETAILED DESCRIPTION OF THE PREFERRED EMBODIMENTS

In a specific embodiment it is in particular preferable for the diffusion step to take place before the contraction in accordance with step iii) is carried out. In order to carry out the diffusion step prior to said contraction, it is desirable to carry out the heating step at a temperature below the softening point of the substrate tube during the diffusion step. On the other hand it is also possible to keep the substrate tube under an internal pressure during the diffusion step so as to prevent the substrate tube from contracting. In order to prevent undesirable evaporation of $SiO_2$ from the interior of the substrate tube, the interior of the substrate tube is washed with an oxygen-containing gas. The diffusion process that is used in the present invention can be realised by means of a stationary oven which fully envelopes the substrate tube, but in specific embodiments it is desirable to use an oven or other heat source which is movable along the length of the substrate tube.

It is in particular preferable to carry out the contraction according to step iii) by using an electric oven, in particular an electric resistance oven or induction oven, which oven in particular provides proper heating of the substrate tube to be contracted.

In order to obtain a gradual build-up of the additional amount of fluor in the last glass layers, it is preferable to carry out the supplying of the additional amount of fluor compound proportionally to a value at least 10%, preferably at least 20%, in excess of the amount of fluor compound that is usually supplied.

Suitable fluor compounds include in particular the hydrogen-free fluor-containing compounds, preferably volatile organic fluor-containing hydrocarbon compounds, such as $CF_4$ and $C_2F_6$, but inorganic fluor containing compounds, such as $SiF_4$, can be used too, with the use of $C_2F_6$ being preferred, since a distinct effect can already be observed when a small amount thereof is used.

The present invention furthermore relates to a method for manufacturing an optical fibre, which method is characterized in that the bar-shaped preform obtained in accordance with the method as described above is used.

The appended FIGURE schematically shows the spectral attenuation gradient which is typical of an optical fibre. It should be understood that the appended FIGURE merely functions to explain the present invention and should by no means construed as constituting a limitation of the scope thereof. The FIGURE shows the three situations, viz. (1) an optical fibre obtained from a preform according to the prior art, in which no special measures have been taken to reduce the characteristic peak at 1385 nm, (2) an optical fibre in which an additional amount of fluor compound has been added during the PCVD process in a conventional manner, as a result of which the additional amount of fluor compound has been incorporated in the optical glass fibre, in which embodiment the reduction of the refractive index that results from said additionally incorporated amount of fluor compound is compensated by the simultaneous incorporation of a dope which increases the refractive index, such as $GeO_2$, in order to thus maintain the refractive index of the light-conducting core at a value equal to the value as measured in situation (1), and (3) an optical fibre obtained from a preform manufactured in accordance with the present method, in which an additional amount of fluor compound has been added to the interior of the substrate tube during the PCVD process, and in which fluor has subsequently been removed from the deposited glass layers by diffusion.

The FIGURE clearly shows that although the attenuation peak exhibits a significant decrease at 1385 nm in situation (2), the attenuation in the rest of the spectrum increases, which increase is undesirable in practice. It follows clearly from the curve according to situation (3) that it is possible after execution of the present method to effect a decrease of the attenuation peak at 1385 nm without said decrease leading to an increase of the attenuation in the rest of the spectrum.

EXAMPLE 1

A bar-shaped preform was manufactured in accordance with a usual method, and at the end of the process of depositing glass layers on the inner side of the substrate in accordance with step ii) the amount of fluor compound added to the interior of the substrate tube in accordance with step i) was increased by a value of at least 10%, after which the substrate tube was subjected to a heat treatment under conditions such that diffusion of the additionally incorporated fluor from the deposited glass layers occurred. The measured attenuation decrease in comparison with the attenuation decrease in a standard optical fibre ranged from about −0.09 to about −0.12 dB/km.

EXAMPLE 2

The same operations as in Example 1 were carried out, with this difference that 20% extra freon ($C_2F_6$) was added. The measured attenuation decrease in comparison with the attenuation decrease in a standard optical fibre ranged from about −0.20 to about −0.25 dB/km.

COMPARATIVE EXAMPLE 1

The same operations as in Example 1 were carried out except that 5% extra freon ($C_2F_6$) was added. The measured attenuation decrease in comparison with the attenuation decrease in a standard optical fibre ranged from about 0 to about −0.07 dB/km.

The invention claimed is:

1. A method for manufacturing a bar-shaped preform, which method comprises the following steps:
   i) supplying one or more reactive gases which comprise an amount of fluor compound, which may or may not be doped, to the interior of a substrate tube,
   ii) carrying out a deposition reaction of gases from step i) in said substrate tube so as to obtain one or more glass layers on the interior of the substrate tube, and
   iii) contracting the substrate tube from step ii) while heating said tube so as to obtain the massive, bar-shaped preform, wherein
   the amount of fluor compound that is supplied to the interior of the substrate tube in accordance with step i) is increased by a value of at least 10% at the end of the deposition of glass layers on the inner side of the substrate tube in accordance with step ii), after which the substrate tube is subjected to a heat treatment under conditions such that diffusion of the additionally incorporated fluor from the deposited glass layers will occur.

2. A method according to claim 1, wherein the diffusion step takes place before the contraction in accordance with step iii) is carried out.

3. A method according to claim 1, wherein an electric oven is used in step iii).

4. A method according to claim 1, wherein in that the supplying of the additional amount of fluor compound is carried out proportionally.

5. A method according to claim 1, wherein the supply of the increased amount of fluor compound to the interior of the substrate tube at the end of step ii) is not compensated by the simultaneous supply of one or more components that increase the refractive index.

6. A method according to claim 1, wherein $C_2F_6$ is used as the fluor compound.

7. A method for manufacturing an optical fiber, using a bar-shaped preform obtained by using a method according to claim 1.

8. A method according to claim 2, wherein the heating step is carried out at a temperature below the softening point of the substrate tube during the diffusion step.

9. A method according to claim 2, wherein the substrate tube is kept under an internal pressure during the diffusion step so as to prevent the substrate tube from contracting.

10. A method according to claim 2, wherein the diffusion step takes place during the contraction in accordance with step iii).

11. A method according claim 2, wherein the interior of the substrate tube is washed with an oxygen-containing gas during the diffusion step.

* * * * *